United States Patent [19]
Yoshimoto et al.

[11] Patent Number: 4,775,965
[45] Date of Patent: Oct. 4, 1988

[54] OPTICAL SYSTEM FOR RECORDING, REPRODUCING, AND/OR ERASING INFORMATION

[75] Inventors: Kyosuke Yoshimoto; Osamu Ito, both of Hyogo, Japan

[73] Assignee: Mitsubishi Denki Kabushiki Kaisha, Japan

[21] Appl. No.: 99,488

[22] Filed: Sep. 22, 1987

[30] Foreign Application Priority Data

Sep. 26, 1986 [JP] Japan .................. 61-228928

[51] Int. Cl.⁴ .................................. G11B 7/00
[52] U.S. Cl. ........................ 369/44; 369/45; 369/46; 369/109; 369/275
[58] Field of Search ................. 369/43–47, 369/109, 111, 275, 276; 358/342

[56] References Cited

U.S. PATENT DOCUMENTS 4,327,430 4/1982 Wada et al. ................. 369/43
4,607,358 8/1986 Maeda et al. ................. 369/44
4,703,408 10/1987 Yonezawa et al. ............. 369/44

OTHER PUBLICATIONS

Spie, vol. 259, Optical Mass Data Storage, (1985), pp. 145–149.
Transaction of Applied Physics, (Japan), Spring 1986, 2a-H-2.

Primary Examiner—Robert L. Richardson
Attorney, Agent, or Firm—Wolf, Greenfield & Sacks

[57] ABSTRACT

Disclosed in a system for recording, reproducing, and/or erasing information as recording pits on a recording medium. This medium has guide grooves for recording reproducing, and/or erasing the informatin signal. A condition whereby the value which is obtained by subtracting the groove width from the groove pitch is larger than a width of the recording pits is satisfied. A predetermined position for recording, reproducing, and/or erasing is set between the guide grooves. Alternatively, a condition whereby the width of a guide groove is larger than the width of a recording pit is satisfied. A predetermined position for recording, reproducing, and/or erasing is set on the guide groove.

3 Claims, 6 Drawing Sheets

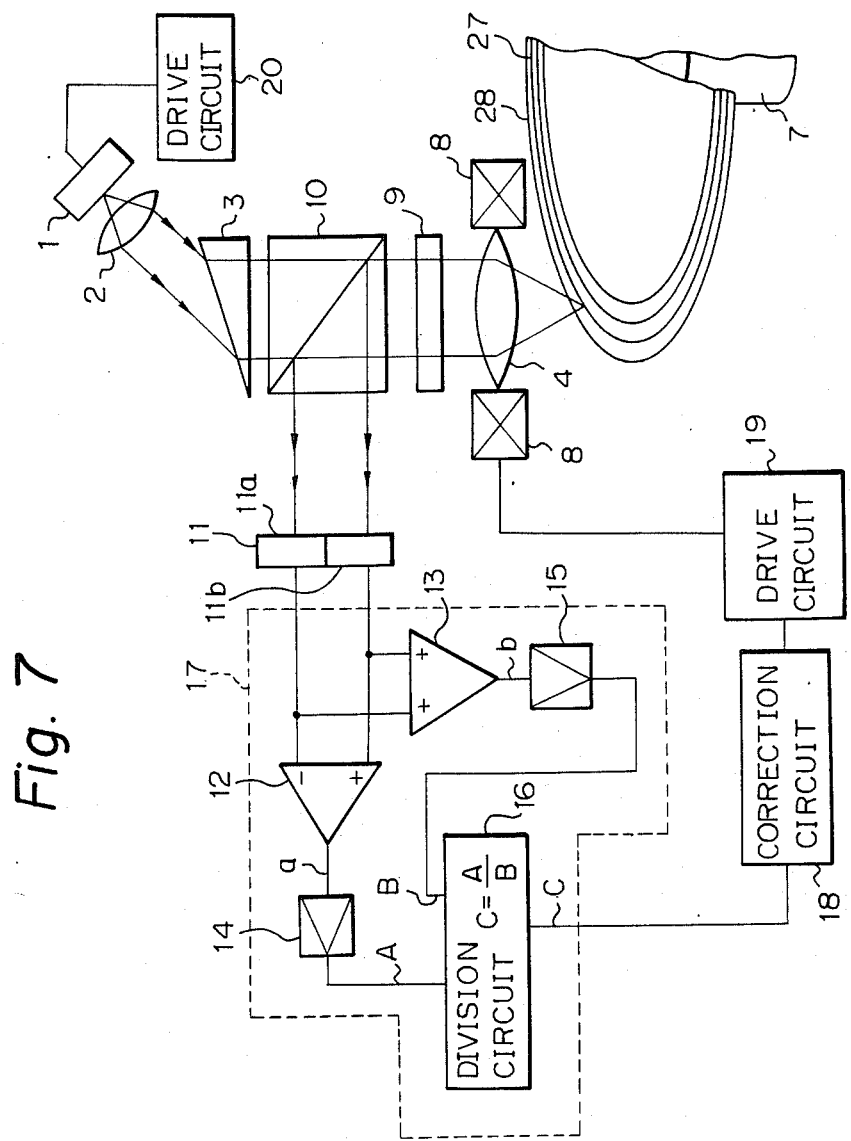

OPTICAL SYSTEM FOR RECORDING, REPRODUCING, AND/OR ERASING INFORMATION

BACKGROUND OF THE INVENTION

1. Field of the Invention

This invention relates generally to a system for optically recording, reproducing, and/or erasing information and, more particularly, to an optical system which is adapted to stabilize feedback control with high accuracy for the positioning means of an information recording, reproducing and/or erasing device.

2. Description of the Prior Art

As is known in the art, there is a conventional information recording and/or reproducing apparatus of the write once type optical disk system wherein semiconductor laser is directly modulated by an information signal and holes are formed in a rotating disk-shaped recording medium, thereby recording the information, and the power of semiconductor laser is reduced to such a level that no hole is formed in the recording medium and is irradiated onto the disk-shaped recording medium, thereby reproducing the information on the basis of the intensity of the light reflected from the recording medium. An example of such read-write type optical systems is shown in Japanese patent application No. 149157/1984 (Japanese patent public disclosure No. 26942/1986) which was filed by the applicant of the present invention. FIG. 1 shows a constitutional diagram of a conventional system for recording and/or reproducing information according to this patent application, in which the portions which are not concerned with the present invention are omitted.

In FIG. 1, reference numeral 1 denotes a light source consisting of, e.g., a semiconductor laser; 2 is a collimator lens for converting the light beams from the light source 1 into the parallel light flux of the beams; 3 a prism for compensating expansion angles of the light beams from the light source 1, which expansion angles vary with the incident angle of the light to the lens 2; 4 an objective lens for condensing the parallel light flux onto a disk 5 on which concentric or spiral guide grooves 6 have been previously formed and which has a recording medium consisting of a reflecting film or the like. The disk 5 is rotated by a disk motor 7. Numeral 8 denotes an objective lens actuator which is constituted by something like a voice coil of a speaker. The actuator 8 moves the objective lens 4 in the radial direction of the disk 5, for the purpose of enabling a light spot focused by the objective lens 4 to be maintained at the center of the guide groove 6. Numeral 9 indicates a quarter-wave plate (a ¼ plate) for shifting the phase of the light from the light source 1 by ¼ wavelength and thereby shifting the reflected lights from the disc 5 by the total of ½ wavelength for the round trip; 10 denotes a beam splitter for bending the optical path of the reflected phase-shifted light by an angle of about 90° as shown; and 11 a two-split type photodetector consisting of photo sensing devices 11a and 11b for receiving the reflected light and converting it into an electric signal. Further, numeral 12 denotes an arithmetic circuit for calculating the difference between the outputs of the photo sensing devices 11a and 11b of the photodetector 11; 13 is an arithmetic circuit for calculating the sum of those outputs; 14 and 15 amplifiers for amplifying the outputs "a" and "b" of the arithmetic circuits 12 and 13, respectively; and 16 a division circuit for dividing the output "A" of the amplifier 14 by the output "B" of the amplifier 15 and outputting a correction error signal C (=A/B). The components 12 to 16 coact to form a position deviation detecting section 17 for controlling the position of the objective lens 4. Reference numeral 18 denotes a correction circuit for compensating the phase delay or the like of the correction errorsignal "C"; 19 is a drive circuit for making the actuator 8 operative on the basis of the output form the correction circuit 18; and 20 a drive circuit for modulating the light source 1.

The operation of the conventional system constituted as mentioned above will now be explained with reference to FIG. 1 and an operation explanatory waveform diagram shown in FIG. 2.

The light emitted from the light source 1 is converted into parallel light flux by the collimator lens 2 and is waveform-shaped by the prism 3. Thereafter, the light flux is transmitted through the beam splitter 10 and then the phase of the light is shifted by ¼ wavelength through the ¼ wavelength plate 9. Then, the phase shifted light flux is foousedonto the guide groove 6 of the disk 5 by the objective lens 4.

In the case of recording the information onto the disk 5 at this time, the drive circuit 20 directly modulates the light source 1 in accordance with the information signal to be recorded in the groove. Thus, the energy density of the focused light spot is increased to a value above which the density is enough to change the reflection factor of the recording medium in the guide groove 6, or decreased below such density. For example, in the case of recording such an information signal as shown in FIG. 2(A), when the logical level of the signal is "1", the emitting light power from the light source 1 is increased to evaporate the recording medium of the guide groove 6 and the reflection factor in this portion is remarkably reduced and the power is decreased when the logical level is "0" so that the recording medium is not changed, thereby recording the information signal consisting of the signal levels "0" and "1" in the guide groove 6.

On the other hand, in the reproducing mode, the energy density of the focused light spot is maintained below the level at which the recording medium is evaporated. For example, assuming that the information signal as shown in FIG. 2(A) has been recorded in the guide groove 6, the light reflected from this portion is transmitted through the objective lens 4 to the quarter-wave plate 9 where the phase is shifted by ¼ wavelength. Thereafter, the phase shifted light is bent by an angle of about 90° through the beam splitter 10 and is fed to the photodetector 11. Since the guide groove 6 has a structure which is convex or concave relative to the portion around this groove by an amount of about ¼ wavelength, the reflected lights are diffracted by the side wall of the guide groove 6, so that the positional deviation between the focused light spot and the guide groove 6 causes an anisotrophy in the reflected lights. Therefore, by deducing the difference between the outputs of the photo sensing devices 11a and 11b of the photodetector 11, the error signal "a" for the tracking control of the objective lens 4 can be obtained. Further, by deducing the sum of the outputs of the photo sensing devices 11a and 11b, an information signal such as that shown in FIG. 2(B) (the output of the arithmetic circuit 13 in the recording mode) can be derived for the information signal shown in FIG. 2(A) in the recording mode, while an information signal such as that shown in FIG. 2(C) (the output of the arithmetic circuit 13 in the reproducing mode) can be obtained in the reproducing mode for the disk 5 on which the information signal as shown in FIG. 2(A) was recorded, respectively.

In addition, the output "A" which is amplified by the amplifier 14 is divided by the output "B" which is similarly amplified by the amplifier 15 in the division circuit 16. The output of the circuit 16 is used as the correction error signal "C" which is transmitted to the correction circuit 18. The correction circuit 18 compensates, for example, the phase of the error signal, and the corrected signal is delivered to the drive circuit 19 used for the objective lens actuator 8. The objective lens 4 is controlled in a feedback manner so that the light spot focused by the objective lens 4 is located at the center of the guide groove 6. The reason why the output of the division circuit 16 is used as the correction error signal "C" as the input variable for the feedback control of the objective lens 4 is to make it possible to compensate the fluctuation in servo loop gain of the tracking in association with the change of a large amount of light between the recording and reproducing modes, the change in reflection factor of the recording medium in the reproducing mode, and the change in transmittance of the optical system.

The conventional system for recording and/or reproducing information is constituted as described above. Thus, means for recording and/or reproducing an information signal onto/from a recording medium is positioned over the guide groove of the recording medium by the feedback control using a correction error signal "C" derived from an error signal "a".

In general, the guide groove is formed by a discrete apparatus, a so-called master recorder wherein a photo resist on a glass plate whose surface is finished like a mirror is exposed using a light spot whose diameter is smaller than the focused light spot which is used in the signal recording and/or reproducing means for recording and/or reproducing information and then the exposed photo resist is developed.

Therefore, the width of recording pits on the recording medium produced by means for recording and/or reproducing information is larger than that of the guide groove. Thus, there is a problem in that the groove structure is partially destroyed and a positioning error signal for controlling the positioning of the recording and/or reproducing means over the guide groove can not be derived from the portion of the recording pit.

For overcoming this problem, a method whereby a correction error signal which is derived by dividing the error signal by the sum of the outputs of the respective photo sensing devices is utilized (hereinafter, this method is called an auto gain control (AGC) with the meaning that the positioning control loop gain is corrected), but this method is not effective.

This is because when the light spot is located on the recording pit, the sum of the outputs does not become zero due to the reflected lights from the outside portion surrounding the recording pit of the light spot; on the other hand, the error signal becomes zero in principle since the groove structure has been lost.

FIG. 3 shows the results of certain experiments. The width of a guide groove was set at 0.6 μm. A recording pit was formed so as to have a width of about 0.8 μm. Since the pitch of the guide grooves is 1.6 μm, the error signals (in the diagram, since these error signals are used for tracking, they are represented as the amplitude of a tracking sensor) which are obtained when the light spot traverses the guide grooves are a periodic function with a period of 1.6 μm. Therefore, amplitudes of tracking sensors before and after the foregoing AGC were measured, wherein the power of the light at the recording medium is used as a parameter.

It will be found from the results of these experiments that it is hardly possible to expect that the desired effect of the AGC can be achieved.

Since the recording pit length is constant, as the recording frequency rises, the rate at which the guide grooves become lost due to the forming of the recording pits increases and the amplitude of the tracking error signal decreases, namely, the sensitivity deteriorates. The tracking servo positioning control) loop gain decreases and the feedback loop becomes unstable.

This problem becomes a large obstacle in terms of obtaining high-density recording on a recording medium.

SUMMARY OF THE INVENTION

The present invention has been accomplished in order to solve the foregoing problems and it is an object of the invention to provide a system for recording, reproducing, and/or erasing information in which high-density recording can be performed on a recording medium without even recording pits causing a reduction in the servo loop gain.

According to a system for recording, reproducing, and/or erasing information which forms one aspect of the invention, a recording medium has a guide groove for recording, reproducing, and/or erasing the information signal and, at the same time, the condiiion whereby the value which is derived by subtracting the groove width from the groove pitch is larger than the width of a recording pit is satisfied. A predetermined position for recording, reproducing, and/or erasing is set to a position between the guide grooves. The positioning control means has means for controlling the positioning means in a feedback manner after the positioning error signal taken out as the difference between the outputs of at least two detecting devices is divided by the sum of the outputs of these two detecting devices.

According to a system for recording, reproducing, and/or erasing information which represents another aspect of the invention, a recording medium has a guide groove for recording and/or reproducing an information signal, the condition whereby the guide groove width is larger than the width of recording pit being at the same time satisfied, and a predetermined position for recording, reproducing, and/or erasing is set in the guide groove. The positioning control means has means for controlling the positioning means in a feedback manner after a positioning error signal taken out as the difference between the outputs of at least two detecting devices is divided by the sum of the outputs of these two detecting devices.

Thus, according to the invention, the positioning of the means for recording, reproducing, and/or erasing an information signal is controlled in such a manner that the recording pit is formed between the guide grooves, wherein the value which is obtained by subtracting the groove width from the groove pitch is larger than the width of a recording pit. According to another aspect of the invention, the positioning of the means for recording, reproducing, and/or erasing information is controlled in such a manner that a recording pit is formed in a guide groove whose width is larger than the width of the recording pit. With such arrangement, the side wall of the guide groove for obtaining a positioning error signal is not lost due to formation of the recording pit. It has therefore been found that a correction error signal which is completely corrected by the AGC can be obtained.

BRIEF DESCRIPTION OF THE DRAWINGS

FIG. 7 is a constitutional diagram of a system for recording and/or reproducing information in another embodiment of the invention.

DESCRIPTION OF THE PREFERRED EMBODIMENTS

An embodiment of the present invention will be described hereinbelow with reference to FIGS. 4 and 5.

Figure 1:
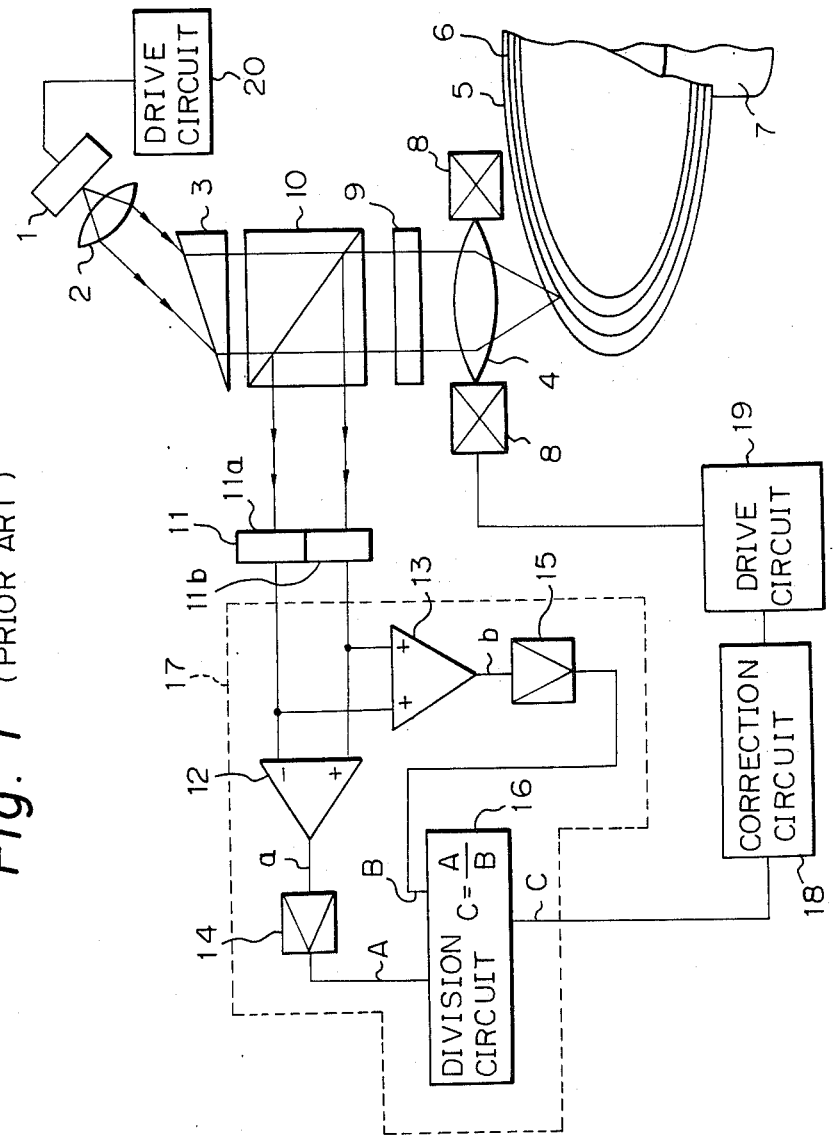
FIG. 1 is a constitutional diagram showing an example of a conventional system for recording and/or reproducing information.
Figure 2:
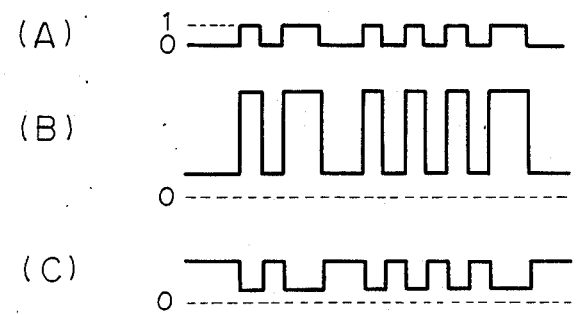
FIGS. 2(A), 2(B) and 2(C) are waveform diagrams explaining the operation of the system shown in FIG. 1.
Figure 4:
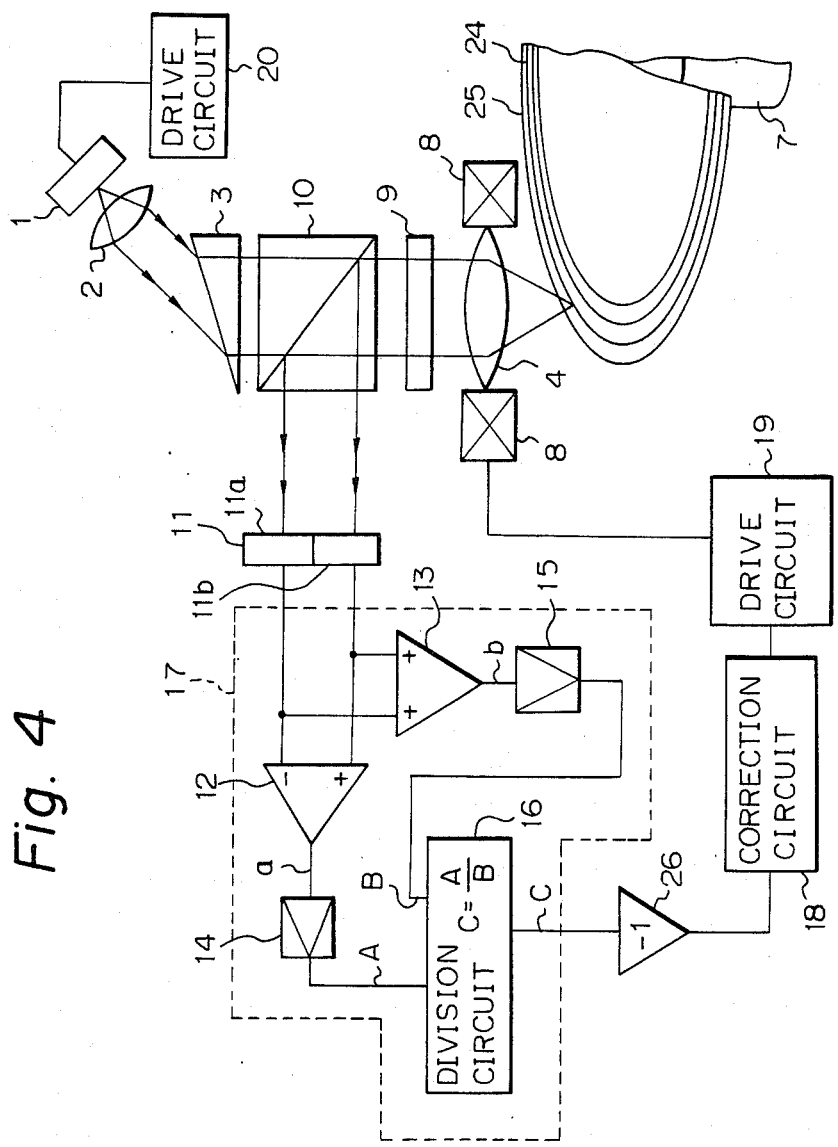
FIG. 4 is a constitutional diagram of a system for recording and/or reproducing information in an embodiment of the present invention.

In FIG. 4, the components indicated by reference numerals 1 to 20 are similar to those in the foregoing conventional system shown in FIG. 1. Reference numeral 24 denotes a guide groove in which the value which is obtained by subtracting the groove width W from a guide pitch "p" is larger than the width "Q" of a recording pit; 25 is a disk having the guide groove 24; and 26 an inverting amplifier for inverting the polarity in order to position a light spot between the guide grooves.

Figure 5:
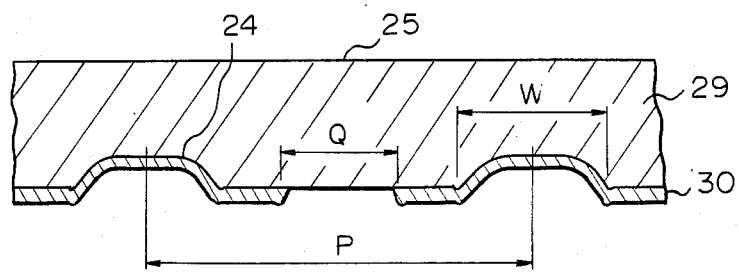
FIG. 5 is a cross sectional view of a disc in FIG. 4.

FIG. 5 shows a cross sectional view of the disk 25.

In the information recording and/or reproducing apparatus constituted as described above, by making use of the fact that the reflected light is diffracted by the side wall of the guide groove 24 in a manner similar to the conventional system, a positioning error signal is obtained at an output of the arithmetic circuit 12 as a difference between the outputs of the two-split type photodetector 11. This error signal is transmitted through the amplifier 14 and amplified thereby. The sum of the outputs of the photodetector 11 is calculated by the arithmetic circuit 13 and is amplified by the amplifier 15. The output "A" of the amplifier 14 is divided by the output "B" of the amplifier 15 by use of the division circuit 16 so that a correction error signal "C" is obtained in a manner similar to the conventional system. In order to drive the objective lens such that the focused light spot is located between the guide grooves, the polarity of the correction error signal "C" is inverted by the inverting amplifier 26 and thereafter, this signal is transmitted to the drive circuit 19 through the correction circuit 18.

Figure 3:
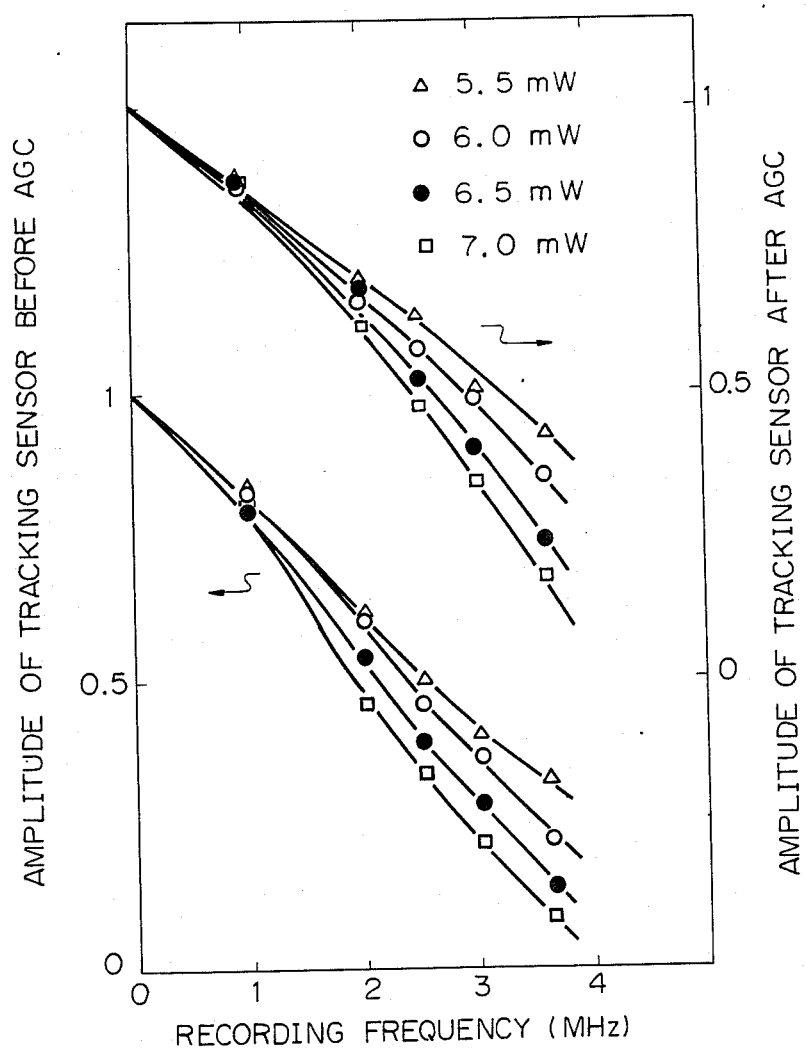
FIG. 3 is an explanatory diagram showing the results of the experiments on the system shown in FIG. 1.
Figure 6:
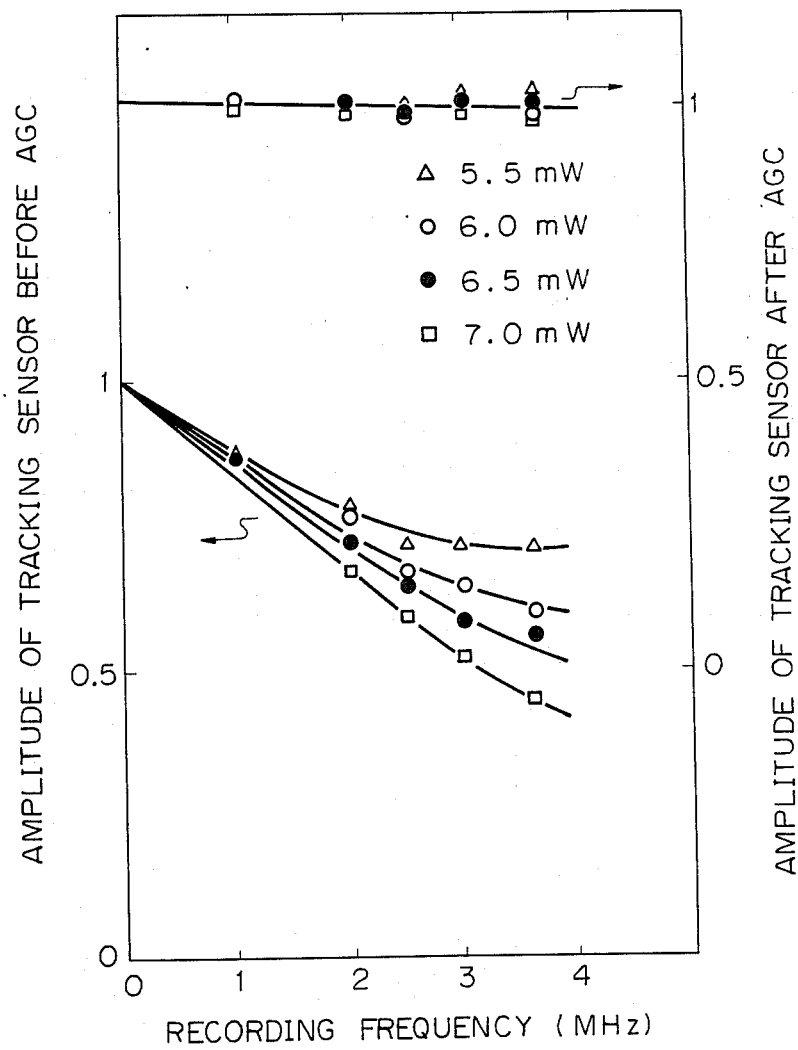
FIG. 6 is an explanatory diagram showing the results of experiments with an embodiment of the invention.

FIG. 6 shows the results of experiments conducted to examine the effect of the correction (AGC) by the division operation in the embodiment. It can be understood from FIG. 6 that the influence of recording pits was substantially perfectly compensated by the AGC as compared with FIG. 3 showing the results of experiments illustrating the effects of the AGC in the conventional system.

Therefore, it is possible to provide a stable positioning control system in which even if high-density recording is performed on a recording medium, the sensitivity of the sensor does not deteriorate and the positioning control loop gain does not change.

Figure 8:
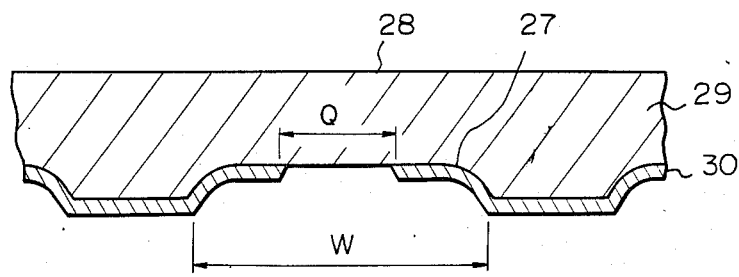
FIG. 8 is a cross sectional view of a disc in FIG. 7.

Another embodiment of the invention will now be described with reference to FIGS. 7 and 8. In FIG. 7, the components indicated at reference numerals 1 to 20 are similar to those in the conventional system shown in FIG. 1. Reference numeral 27 denotes a guide groove whose width "W" is larger than the recording pit width "Q" and 28 indicates a disk having the guide groove 27. FIG. 8 shows a cross sectional view of the disk 28.

In the information recording and/or reproducing system constituted as just mentioned above, even if a recording pit exists, the positioning error signal does not become zero because the side wall remains since the guide groove width "W" is larger than the recording pit width "Q". Therefore, by use of a constitution similar to that of the conventional system, it is possible to realize a positioning control system in which when high-density recording is performed on a recording medium, the sensitivity of the sensor does not deteriorate and the positioning control loop gain does not change.

In the foregoing embodiment, all signals such as video signals, audio signals, facsimile signals and the like which can be converted into binary signals may be used as the information signal. On the other hand, the recording medium is not limited to a disk-like shape and may be in the form of a tape, drum, or the like.

The invention is not limited to an information recording and/or reproducing system but can also be applied to an information recording, reproducing, and/or erasing system having erasing means.

As described above, according to an embodiment of the present invention, recording pits are formed between guide grooves in each of which the value obtained by subtracting the groove width from the groove pitch is larger than the width of the recording pits. The positioning of the means for recording, reproducing, and/or erasing information is controlled by the signal which is obtained by dividing the positioning error signal taken out as the difference between the outputs of at least two detecting devices by the sum of these outputs. Or, according to another embodiment of the invention, recording pits are formed in a guide groove whose width is larger than the width of the recording pits. The position of the signal writing/reading means for recording and/or reproducing information is controlled by the signal which is derived by dividing the positioning error signal taken out as the difference between the outputs of at least two detecting devices by the sum of these outputs. In accordance with either one of the foregoing positioning controls, deterioration of the gain of the positioning feedback control loop due to the recording pit does not occur at all and even for high-density recording positioning control can be performed with extremely high stability. This bring about the advantage of recording density can be significantly raised.

In addition, since the recording track is not influenced by the recording pits, the positioning of the recording track can also be stably controlled in a manner similar to the tracks in which no signal is recorded. This results in the advantage that the control accuracy of positioning is further improved and the quality of reproduced signals is also improved.

Further, there is an additional advantage in that the positioning control performance is improved during recording in a manner similar to the case of reproduction for a recording medium of the type in which holes are formed and the reflection factor is decreased during recording.

Furthermore, it is obvious that similar effects may be obtained even in the case where a recording medium of a phase change type is used.

What is claimed is:

1. A system for recording, reproducing, and/or erasing information comprising:

a recording medium for recording, reproducing, and/or erasing information in the form of recording pits;

means for recording, reproducing, and/or erasing an information signal which is constituted by means for receiving a given information signal and writing onto said recording medium, means for reading out and outputting the information signal recorded on the recording medium, and/or means for erasing the information signal;

means for positioning said signal recording, reproducing, and/or erasing means at a predetermined position for recording, reproducing, and/or erasing; and control means for controlling said positioning means, wherein said recording medium has guide grooves for recording, reproducing, and/or erasing the information signal and, at the same time, a condition whereby the value which is obtained by subtracting a groove width from a groove pitch is larger than the width of a recording pit is satisfied, said predetermined position for recording, reproducing, and/or erasing is set between said guide grooves, said system has a division circuit for dividing a positioning error signal taken out as a difference between the outputs of at least two detecting devices by the sum of the outputs of said two detecting devices, and said positioning means is controlled by an output signal of said division circuit in a feedback manner.

2. A system for recording, reproducing, and/or erasing information comprising:

a recording medium for recording, reproducing, and/or erasing information in the form of recording pits;

means for recording, reproducing, and/or erasing an information signal which is constituted by means for receiving a given information signal and writing onto said recording medium, means for reading out and outputting the information signal recorded on the recording medium, and/or means for erasing the information signal;

means for positioning said signal recording, reproducing, and/or erasing means at a predetermined position for recording, reproducing, and/or erasing; and control means for controlling said positioning means, wherein said recording medium has guide grooves for recording, reproducing, and/or erasing the information signal and, at the same time, a condition whereby the width of said guide groove is larger than the width of a recording pit is satisfied, said predetermined position for recording, reproducing, and/or erasing is set on the guide groove, said system has a division circuit for dividing a positioning error signal taken out as a difference between the outputs of at least two detecting devices by the sum of the outputs of said two detecting devices, and said positioning means is controlled by an output signal of said division circuit in a feedback manner.

3. A system as set forth in claim 1 wherein said control means includes an inverter circuit coupled from said division circuit.

* * * * *